United States Patent [19]

Poinsard

[11] Patent Number: 4,937,583

[45] Date of Patent: Jun. 26, 1990

[54] RADAR RECEIVING DEVICE AND RADAR INCLUDING SUCH A DEVICE

[75] Inventor: Henri Poinsard, Boulogne, France

[73] Assignee: Thomson CSF, Paris, France

[21] Appl. No.: 788,548

[22] Filed: Jul. 24, 1985

[30] Foreign Application Priority Data

Aug. 24, 1984 [FR] France ................................ 84 13193

[51] Int. Cl.$^5$ ............................................. G01S 13/526
[52] U.S. Cl. ...................................... 342/195; 342/196; 342/162; 342/101; 342/100
[58] Field of Search ............... 343/5 FT, 5 DP, 5 PD, 343/7.3, 7.7, 7 A; 342/195, 196, 160, 161, 162, 73, 27, 101, 100

[56] References Cited

U.S. PATENT DOCUMENTS

| | | | |
|---|---|---|---|
| 3,898,658 | 8/1975 | Jensen et al. | 343/5 SA X |
| 4,188,628 | 2/1980 | Langeraar et al. | 343/5 SA |
| 4,207,624 | 6/1980 | Dentino et al. | 343/5 FT X |
| 4,225,864 | 9/1980 | Lillington | 343/5 FT X |
| 4,400,700 | 8/1983 | Rittenbach | 343/5 SA |
| 4,483,017 | 11/1984 | Hampel et al. | 343/5 SA X |

OTHER PUBLICATIONS

Gerlach, "Radar Doppler Processing Using A Fast Orthogonalization Network", U.S. Statutory Invention Registration #H108, Aug. 5, 1986.

Primary Examiner—Thomas H. Tarcza
Assistant Examiner—John B. Sotomayor
Attorney, Agent, or Firm—Cushman, Darby & Cushman

[57] ABSTRACT

Radar apparatus for processing a received signal having a carrier frequency $f_0$ includes means for directing the received signal in parallel into first and second channels. A first filter in the first channel bandpass filters the received signal and is centered at a frequency $f_1$ equal to $f_0 + \Delta_1 f$. The first filter provides an output signal having a central frequency $f_0 + \Delta_1 f/2$. A second filter coupled in the second channel bandpass filters the received signal and is centered at $f_2 = f_0 + \Delta_2 f$. The second filter thus provides an output signal having a central frequency $f_0 + \Delta_2 f/2$. A first mixer in the first channel mixes the first filter output with a signal $f_1 = f_0 + \Delta_1 f/2$ to extract the carrier frequency of the first channel. Likewise, a second mixer in the second channel mixes the second filter output signal with a signal $f_2 = f_0 + \Delta_2 f/2$ to also extract the carrier frequency in the second channel. The ouputs of both mixers are then passed to a processing and exploitation device to manipulate the signals to arrive at the appropriate range and/or velocity information.

20 Claims, 7 Drawing Sheets

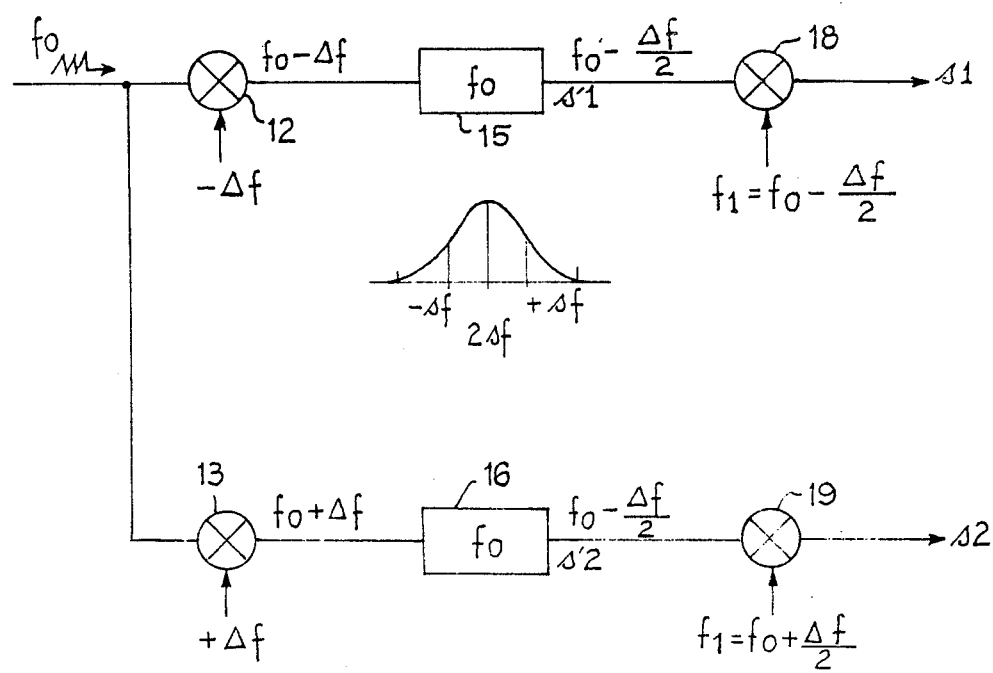
Fig.3
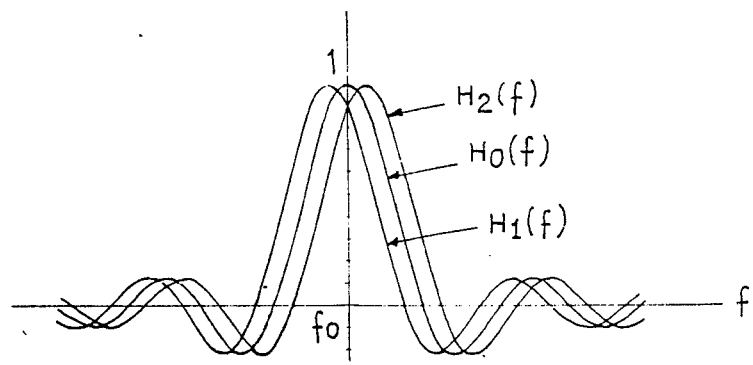
Fig.4
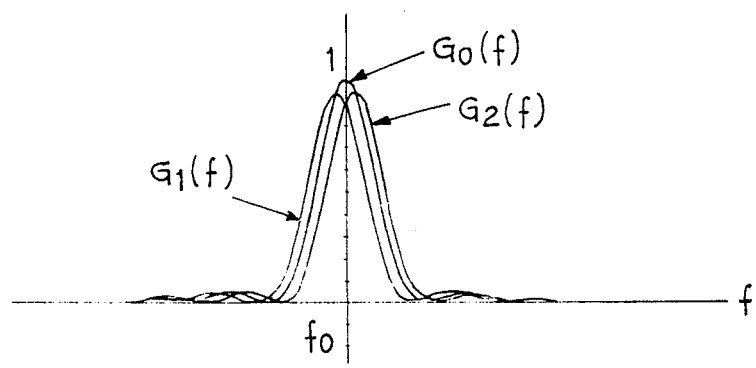

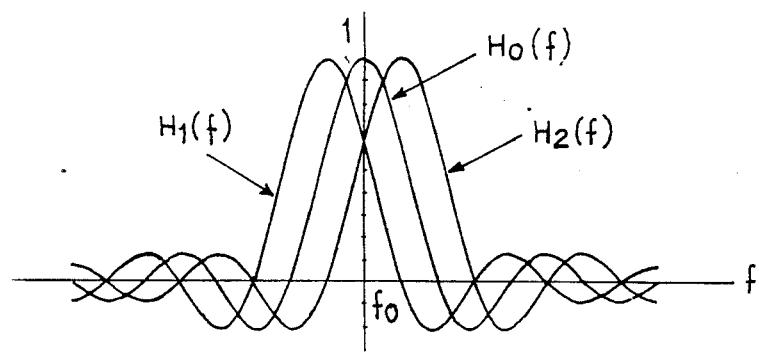
Fig. 5
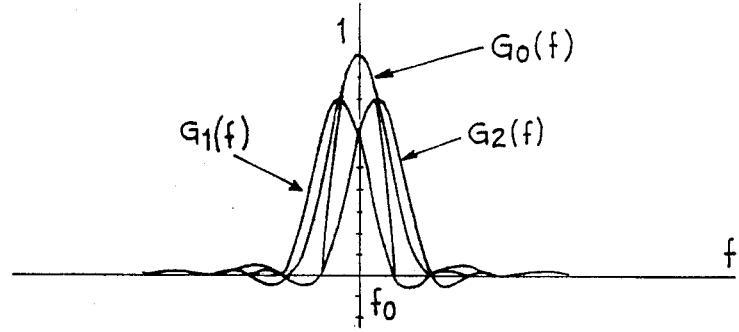
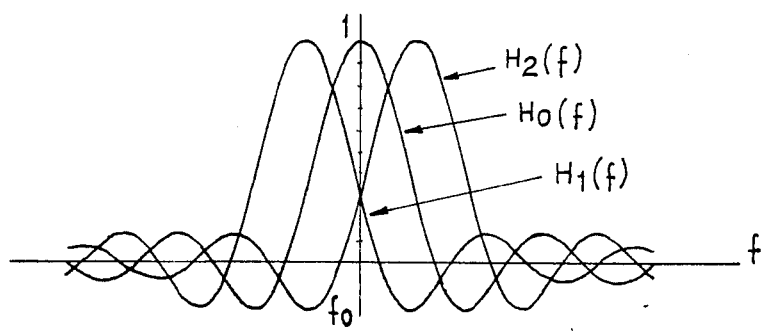
Fig. 6
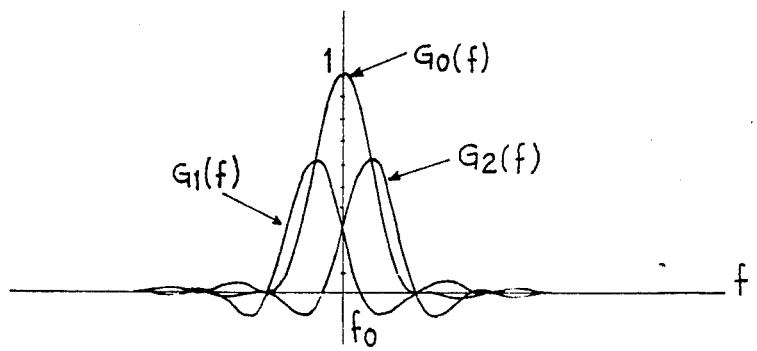

RADAR RECEIVING DEVICE AND RADAR INCLUDING SUCH A DEVICE

BACKGROUND OF THE INVENTION

The present invention relates to a radar receiving device and radars including such devices.

Generally on reception and after transposing into intermediate frequency of the received signal, the usual technique used in radar processing is to produce a filter matched to the transmitted waveform. A matched filter maximizes the signal/thermal noise ratio as its transfer function is identical to the conjugate of the complex Fourier transform of the transmitted waveform. The various realizations of matched filters more or less approach the ideal filter and in order to do this they are more or less complex depending on the type of radar.

In the case of non-coherent radars (i.e. radars in which the phase relationships between successive echos in the same train of pulses are not used), a band filter is used matched to the pulse duration of the transmitted signal and centered on the intermediate frequency of the receiver.

In the case of coherent radars, a set of range gates of duration equal to the pulse duration and covering the whole of the range field is used. Each gate is followed by a bank of frequency filters in the specific case of Doppler radars. Processing then consists in comparing the amplitudes of the output signals from the matched filter, possibly after integration of amplitudes corresponding to several filtering cycles, with a threshold in order to decide if there is an alarm, i.e. the assumption of the existence of a target in the quantum considered (range, velocity, range velocity depending on the type of radar), the number of false alarms having to remain very low.

Most modern radars, particularly airborne radars, are ambiguous either in range or in velocity, or in both range and velocity, which is the case in medium repetition frequency (MRF) radars. Ambiguity is removed from the ambiguous parameters by periodic sequential modifications of the transmitted waveform, which is usually obtained by continuous or discontinuous variations in the recurrence frequency or in the transmitted carrier frequency. The period of these sequences must be sufficiently short for there to remain at least one of them during the illumination time of a target. Certain types of undesirable echos or signals, the characteristics of which are very different from useful echos (ground diffused echos, targets at unreasonable range or velocity), are eliminated by specific devices.

In principle the architecture, essentially based on the production of a traditional matched filter, even though optimized for detecting a target in a wide band white noise environment, has disadvantages when the hostile environment is no longer white noise. In fact the filtering loses information implicitly contained in the received signal and the means subsequently used in processing the filtered signal cannot in any way retrieve this information.

BRIEF SUMMARY OF THE INVENTION

The subject of the present invention is a receiving device capable of taking into account the information implicitly contained in the received signal and which would be lost by the traditional matched filtering techniques. Even though, in theory, this device reduces the signal/thermal noise ratio, the degradation on overall performance of the radar is in general zero or low in comparison with a radar fitted with a traditional processing device.

The subject of the present invention is therefore a radar receiving device, mainly characterized in that it includes a number of receiving channels capable of extracting in parallel information in the various sections of the received signal spectrum.

BRIEF DESCRIPTION OF THE DRAWINGS

Other details and advantages of the invention will appear clearly on reading the following description given with reference to the figures of the appended drawings in which:

FIG. 3 represents a first diagram of a particular embodiment according to FIG. 2;

FIGS. 4, 5 and 6 represent the spectra of the signals obtained and the transfer functions of the filters for different cases;

DETAILED DESCRIPTION OF THE PREFERRED EMBODIMENTS

The device according to the invention is intended to process the received signal in a radar for example after transposition of that signal into intermediate frequency.

Figure 1:
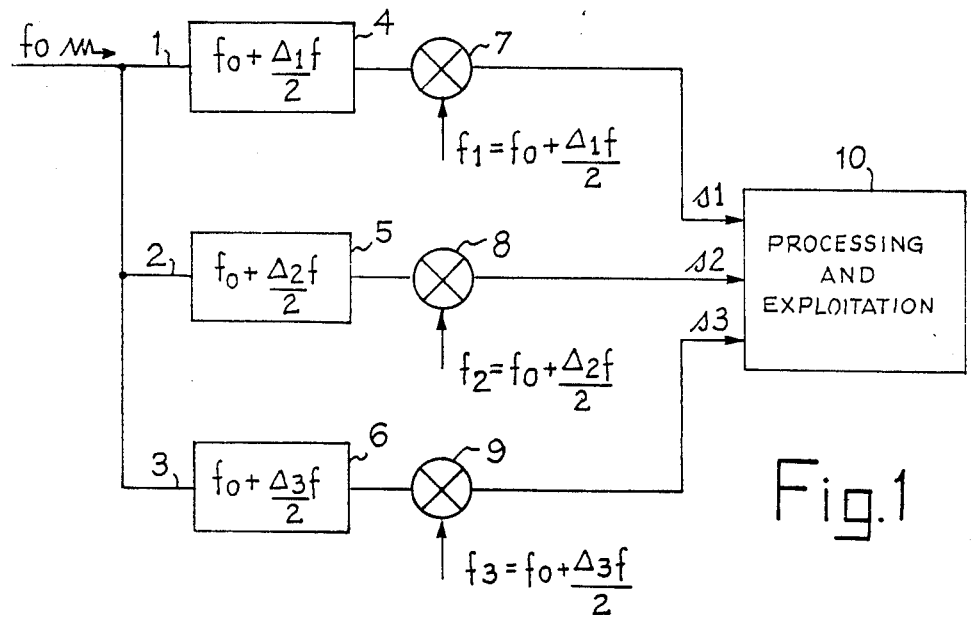
FIG. 1 represents the general block diagram of a first embodiment of the device according to the invention.

FIG. 1 represents the general block diagram of a first embodiment of the device according to the invention.

The device includes a number of receiving channels of which only three are shown, 1, 2 and 3. These channels all receive the signal in parallel after frequency transposition and having the frequency $f_0$ as carrier frequency after transposition. Each of the channels includes a specific filter 4, 5, 6 centered on a frequency $f_a$; a is an index characterizing the channel number, $a = 1, 2, \ldots A$, where A is the number of channels. All the filters have the same passband which is that of the matched filter. Only the central frequency is shifted $f'_1 = f_0 + \Delta_1 f$, $f'_2 = f_0 + \Delta_2 f$ etc . . . Filter 4 is therefore centered on a frequency $f'_1$ contained within the spectrum of the received signal and its passband is that of the matched filter, i.e. about $1/\tau$. Filter 5 is centered on a frequency $f'_2$, filter 6 is centered on a frequency $f'_3$. These filters are not centered on the carrier frequency of the received signal which is $f_0$, the transposition frequency or $f_0+f_{d0}$, $f_{d0}$ being the Doppler frequency corresponding to the central frequency $f_0$ in the case of detection of a moving target. These filters are centered on a frequency which is within the spectrum of this signal.

The output signals of the filters 4, 5 and 6 have central frequencies of $$f_0 + \frac{\Delta_1 f}{2}, f_0 + \frac{\Delta_2 f}{2} \text{ and } f_0 + \frac{\Delta_3 f}{2}$$

respectively. These frequencies are therefore the carrier frequencies of the output signals of the filters.

Each channel therefore has a distinct carrier frequency belonging to the received signal spectrum, it is possible for one of these carrier frequencies to be equal to the frequency $f_0$. The separation between the carrier frequencies and the central frequency $f_0$ must be in the order of $\frac{1}{2}\tau$ where $\tau$ is the duration of a transmitted pulse in order not to degrade the signal to noise ratio too much; values such as $\frac{3}{4}\tau$ or $1/\tau$ are acceptable.

Mixers 7, 8, 9 respectively receive signals at frequencies $f_1$, $f_2$ and $f_3$ such that $$f_1 = f_0 + \frac{\Delta_1 f}{2}, f_2 = f_0 + \frac{\Delta_2 f}{2} \text{ and } f_3 = f_0 + \frac{\Delta_3 f}{2}$$

so as to enable these carrier frequencies to be removed from the incoming signal. We therefore obtain at the output of each of the channels 1, 2 and 3 respectively the signals s1, s2 and s3. A processing and exploitation device 10 takes into account the output signals from the various channels in order to carry out the sorting of the required echoes and interference signals of various origins depending on the type of radar used.

Figure 2:
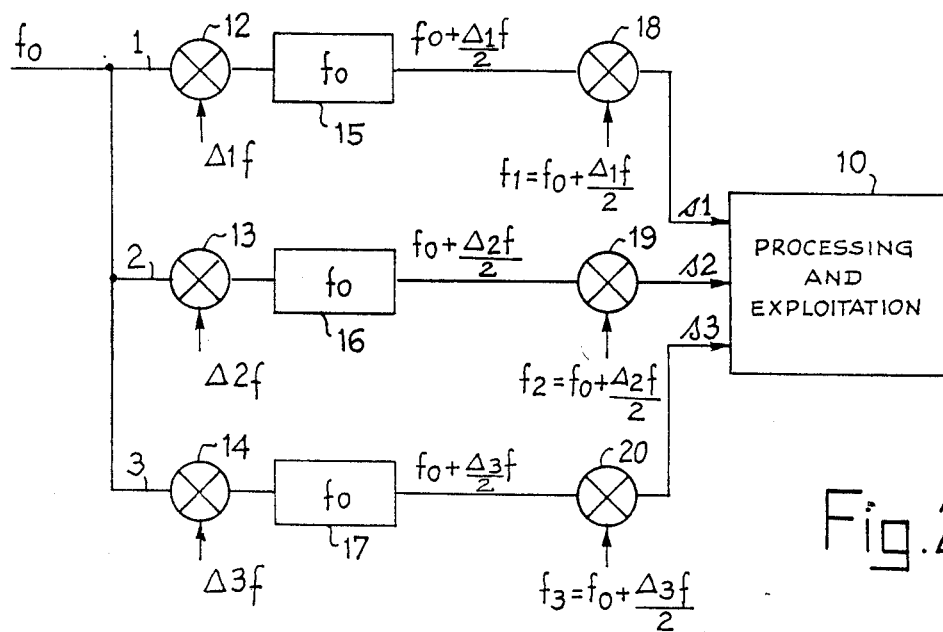
FIG. 2 represents the general block diagram of a second embodiment of the device according to the invention.

In FIG. 2 there is also a representation of a general block diagram of a second embodiment of the receiving device according to the invention.

The device includes in the same way a number of receiving channels (A channels) in parallel of which only three have been represented. These channels receive the signal after frequency transposition and have $f_0$ as carrier frequency after transposition. The incoming signal on each channel has a frequency equal to $f_0$ or $f_0+f_{d0}$ in the case of detection of a moving target.

Each channel includes a mixer, 12, 13 and 14 respectively, carrying out a frequency transposition of value $\Delta_a f$, or $\Delta_1 f$ for the first channel, $\Delta_2 f$ for the second channel and $\Delta_3 f$ for the third channel (a representing the index showing the number of the corresponding channel).

Each channel also includes a filter 15, 16 and 17, these filters being mismatched with respect to the incoming signal as they are centered about the frequency $f_0$, the width of these filters being equal to $\Delta_f$ equal to $1/\tau$. The output signals coming from each filter therefore have carrier frequencies equal to $$f_0 + \frac{\Delta_1 f}{2}, f_0 + \frac{\Delta_2 f}{2} \text{ and } f_0 + \frac{\Delta_3 f}{2}$$

respectively.

Each channel then includes mixers 18, 19 and 20, which respectively receive the output signals of the filters 15, 16 and 17 and signals having as carrier frequencies $f_1$, $f_2$ and $f_3$ such that $f_1$ is equal to $$f_0 + \frac{\Delta_1 f}{2},$$

$f_2$ is equal to $$f_0 + \frac{\Delta_2 f}{2}$$

and $f_3$ is equal to $$f_0 + \frac{\Delta_3 f}{2}.$$

These mixers therefore enable the carrier frequencies $f_1$, $f_2$ and $f_3$ to be removed from the signal. The video signals 11, 12 and 13 coming from each of the channels are then processed in the processing circuit 10. This second embodiment has the advantage of being able to use the equipment already existing in radars, namely the central frequency $f_0$ filters, matched to the receiving intermediate frequency.

FIG. 3 represents a first diagram of a particular embodiment according to the second embodiment represented in FIG. 2.

In this embodiment a number of channels has been chosen equal to two, the translation frequencies of each of these channels being symmetrical about the central frequency $f_0$ of the filters, i.e. of the carrier frequency of the input signal of the receiving device. The received pulses centered on frequency $f_0$ are frequency shifted by $-\Delta f$ in the first channel and by $+\Delta f$ in the second channel. The signal is then filtered in the filters 15 and 16 which are filters matched to the central frequency $f_0$, the corresponding output signals are s'1 and s'2. The frequency spectrum of these signals is the product of the spectra of the input signal and the conjugate of the transfer function of the filter. If we initially consider the case of a rectangular pulse with a fixed carrier frequency the spectra s'1 and s'2 are then respectively given by the following expressions:

$$G_1 = \frac{\sin \pi(f_0 - f)\tau}{\pi(f_0 - f)\tau} \cdot \frac{\sin \pi(f_0 - \Delta f - f)\tau}{\pi(f_0 - \Delta f - f)\tau}$$

$$G_2 = \frac{\sin \pi(f_0 - f)\tau}{\pi(f_0 - f)\tau} \cdot \frac{\sin \pi(f_0 + \Delta f - f)\tau}{\pi(f_0 + \Delta f - f)\tau}$$

In traditional radars in which the frequency shift $\Delta f$ is zero, we obtain the spectrum $G_0(f)$ given by the expression:

$$G_0(f) = \left[ \frac{\sin \tau(f_0 - f)\tau}{\pi(f_0 - f)\tau} \right]^2$$

The mixers 18 and 19 enable the deletion of frequencies $f_1$ and $f_2$, $f_1$ being equal to $$f_0 - \frac{\Delta f}{2}$$

and $f_2$ being equal to $$f_0 + \frac{\Delta f}{2}$$

in order to carry out the subsequent processing.

FIGS. 4, 5 and 6 represent the spectra $G_1$, $G_2$ of the output signals of filters 15, 16 and the spectrum of the output signal of a matched filter centered on frequency $f_0$, $G_0$. The transfer functions of the filters $H_1$, $H_2$ and $H_0$ respectively have also been represented. In FIG. 4 we have chosen a $\Delta f$, i.e. the frequency shift between $f_1$ and $f_2$, equal to $\frac{1}{4}\tau$; in FIG. 5 we have chosen a $\Delta f$ equal to $\frac{1}{2}\tau$ and in FIG. 6, $\Delta f = \frac{3}{4}\tau$. It is noted that for the embodiment represented in FIG. 3 in which the frequencies $f_1$ and $f_2$ are symmetrical with respect to the central frequency $f_0$, the functions $G_1$ and $G_2$ are respectively symmetrical with respect to $$f_0 - \frac{\Delta f}{2} \text{ and } f_0 + \frac{\Delta f}{2}$$

and have their maxima for these values of f:

$$G_1(f)_{max} = G_2(f)_{max} = \frac{\sin \pi \frac{\Delta f}{2} \tau}{\pi \frac{\Delta f}{2} \tau}$$

We will note that for values of f in the order of magnitude of $\frac{1}{2}\tau$, the spectra $G_1$ and $G_2$ are sufficiently separated and their shape is very close to $G_0$. Their spectral width is very close to that of $G_0$, which maintains the range resolution power. Values $\Delta f << \frac{1}{2}\tau$ are usable, but are of less interest. Values $>> \frac{1}{2}\tau$ are also usable, if the signal/thermal noise ratio remains sufficient. Everything therefore happens at the level of each received pulse as if we had two identical radars, strictly synchronous and shifted in frequency by two times $\Delta f/2$ equal to $\Delta f$; the carrier frequency of the signal $s'1$ at the output of filter 15 (or the central frequency of the spectrum) being $f_1$ where $$f_1 = f_0 - \frac{\Delta f}{2}$$

and the carrier frequency of signal $s'2$ at the output of filter 16 being $f_2$ where $$f_2 = f_0 + \frac{\Delta f}{2}.$$

Figure 7:
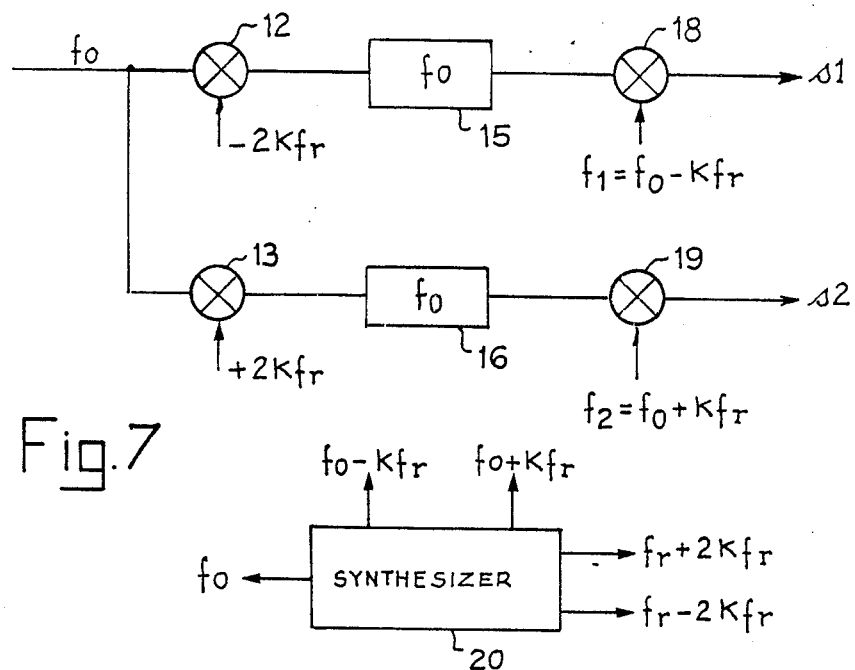
FIG. 7 represents a second diagram of a particular embodiment according to FIG. 2.

FIG. 7 represents a particular embodiment according to FIG. 2 relating to a second type of transmission-reception. This embodiment relates to the case in which trains of coherent pulses with a fixed carrier frequency and with a recurrence frequency of $f_r$ are transmitted. As in the case of traditional coherent radars in which the intermediate transposition frequency must be very stable, sufficiently stable transposition frequencies $f_1$ and $f_2$ must be chosen. In this embodiment the shift between the two central frequencies $f_1$ and $f_2$ is equal to $2Kf_r$, where K is an integer. By means of the first mixer 12 a translation of the frequency of the received signal $f_0$ by a value $\Delta f$ equal to $-2Kf_r$ is therefore carried out; and in the same way a frequency translation by means of mixer 13 of the frequency of the received signal $f_0$ by a value equal to $\Delta f = 2Kf_r$ is carried out.

Filters 15 and 16 then enable the spectrum to be obtained about the central frequencies $f_0 - Kf_r$ and $f_0 + Kf_r$. Mixers 18 and 19 then suppress the carrier frequencies or central frequencies $f_1$, $f_2$, $f_1$ being equal to $f_0 - Kf_r$ and $f_2$ being equal to $f_0 + Kf_r$. A frequency synthesizer 20 will for example provide the reference frequencies $f_r \pm 2Kf_r$, $f_0 - 2Kf_r$ and $f_0 + Kf_r$ and preferably also the intermediate frequency $f_0$ (which represents the constant shift between the transmission frequency and the local ultra high frequency reception oscillator).

Throughout the previous description we have ignored the Doppler effect due to moving targets. In fact we have considered the case of echoes from a fixed target, i.e. echoes for which there is no variation in range, the received signal being the transmitted signal delayed by a value $\tau_0$.

In the case of a moving target the received signal is contaminated by a Doppler frequency $f_{d0}$. If we consider that $V_r$ is the radial velocity of the target and $f_e$ is the transmission frequency, the reception frequency $f'_e$ will be equal to $$f_e\left(1 + \frac{2V_r}{C}\right) \text{ or } f_e + f_{d0}, f'_r = f_r\left(1 + \frac{2V_r}{C}\right), \frac{2V_r}{C}$$

being in the order of $10^{-5}$ for the fastest usual targets, we will therefore use the approximation $f'_r = f_r$; also, the central frequency $f_0$ becomes $f'_0 = f_0 + f_{d0}$, both the spectra $H_1$ and $H_2$ are therefore shifted by $f_{d0}$ to the right or to the left depending on the sign of $V_r$ with respect to the spectrum $H_0$ and the central frequencies of $G_1$ and of $G_2$ are respectively $$f_1 = f_0 - \frac{\Delta f}{2} + \frac{f_{d0}}{2} \text{ and } f_2 = f_0 + \frac{\Delta f}{2} + \frac{f_{d0}}{2}.$$

The amplitudes of $G_1$ and $G_2$ become slightly different in this case. By taking values of $f_{d0}$ which do not exceed about 10% of $1/\tau$, the resultant variations in $s1$ and $s2$ differ by less than 5%.

The appearance of Doppler frequencies do not change the principle of the invention in any way, as these frequencies are very low with respect to the carrier frequency; there is approximately the same energy about the transposition frequencies $f_a$ and $f_a + f_{d0}$.

Figure 8:
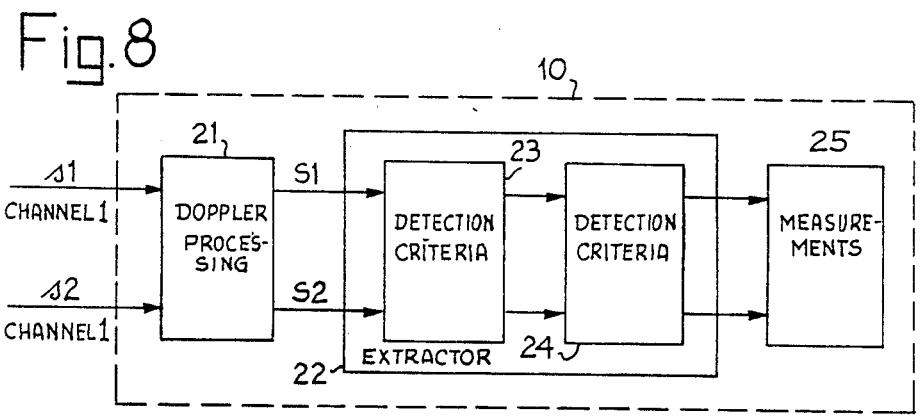
FIG. 8 represents a general block diagram of an embodiment of the processing circuit 10.

FIG. 8 represents the general diagram of the embodiment of the processing circuit 10.

This circuit 10 is capable of receiving the video signals coming from each channel 1, 2, ... A. For purposes of simplification we shall limit ourselves to the case of two channels 1, 2. The video signals $s1$ and $s2$ are processed by a Doppler processing circuit 21 which is for example embodied by means of a Fourier transformer. The signals coming from the Doppler processing are processed by an extractor circuit 22 enabling the application of detection decision criteria according to the required use characterizing the type of radar. Circuit 22 includes operators 23 enabling the application of the detection criteria followed by comparator circuits 24 enabling the application of the detection decision criteria. The extractor circuit 22 is followed by a measuring circuit 25 enabling the measurement of the velocity and/or the range of the detected targets. Circuits 21 to 25 enable the exploitation of the data coming from each channel and the association thereof in order to obtain rapid measurement of the parameters (range, velocity) of the targets and/or to carry out the sorting of the required echoes and the interference signals.

Figure 9:
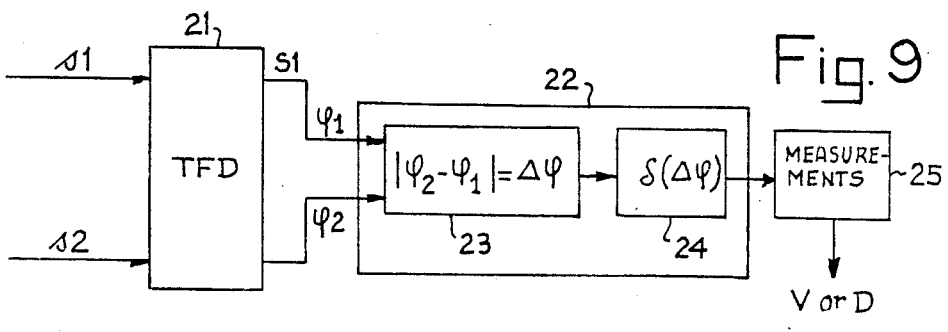
FIG. 9 represents a first particular embodiment of circuit 10.

FIG. 9 represents a first embodiment of the processing circuit 10. This circuit enables a radar with a low recurrence frequency, and therefore ambiguous in velocity, to measure the radial velocity of target s.

Signals S1 and S2 can be either individually considered pulses or signals coming from Doppler filters corresponding to the coherent integration of trains of pulses. In this embodiment the signals S1 and S2 come from Doppler filters and are obtained by discrete Fourier transform by means of operator 21. This circuit is followed by an extractor circuit 22 which includes the operators 23 and 24.

By means of operator 23 we measure the phase difference between the two channels $\phi_2 - \phi_1$, which gives a measurement of the Doppler frequency shift for a coherent radar (from pulse to pulse or between successive filtering cycles). In fact the phases of the signals S1 and S2 are:

$$\phi_1 = 2\pi f_{e1} \tau_0 + \phi_{01} \text{ where } f_{e1} = f_e - \frac{\Delta f}{2}$$

$$\phi_2 = 2\pi f_{e2} \tau_0 + \phi_{02} \text{ where } f_{e2} = f_e + \frac{\Delta f}{2}$$

$$f_{d1} = \frac{2V_r \cdot f_{e1}}{c} \quad f_{d2} = \frac{2V_r \cdot f_{e2}}{c}$$

$$\Delta f_d = f_{d2} - f_{d1} = \frac{2V_r}{c} \Delta f$$

$f_e$ being the transmitted carrier frequency, $\phi_{01}$ a $\phi_{02}$ being known original phases. The two channels therefore make Doppler frequencies appear corresponding to the transmission frequencies $f_{e1}$ and $f_{e2}$ such that:

$$f_{d1} = 2V_r \frac{f_{e1}}{C}$$

and $$f_{d2} = 2V_r \frac{f_{e2}}{C}$$

the separation between the two Doppler frequencies $\Delta f_d$ being equal to $$\frac{2V_r}{C} \Delta f.$$

The operator 24 measures the variation of this phase separation $\Delta \phi$ as a function of time. This measurement is therefore a measurement of the Doppler frequency shift which itself forms a measurement of the radial velocity $V_r$ and is carried out by circuit 25. This Doppler frequency shift enables another Doppler frequency to be revealed $$fd = 2V_r \frac{\Delta f}{C}$$

where the transmission frequency would be $\Delta f$ instead of $f_e$, which corresponds to two measurements of $V_r$ which are very widely non-ambiguous for most of the usual cases.

The ambiguity is removed by comparison of phase variations on the two channels between two times.

In the case of incoherent radars or radars which vary in frequency from pulse to pulse or between successive Doppler filtering cycles, the original phases $\phi_{01}$ and $\phi_{02}$ must be taken into account at each observation.

At a first observation:

$$\Delta \phi = 2\pi \Delta f \tau_0 + \phi_{02} - \phi_{01}$$

At a second observation:

$$\Delta \phi' = 2\pi \Delta f \tau'_0 + \phi'_{02} - \phi'_{01}$$

The variation in phase between the two corresponding times is given by the expression:

$$\delta(\Delta \phi) = 2\pi \Delta f \delta \tau_0 + \delta \phi_{02} - \delta \phi_{01}$$

The ambiguity is removed by comparison between the two times of variations in phase on the two channels taking account of $(\delta \phi_{02} - \delta \phi_{01})$.

For radars which are ambiguous in range, the removal of ambiguity is carried out by successive observations of the separation $\Delta \phi$ between the two channels after a slight variation in $\Delta f$, or $\delta(\Delta f)$. At time $t_0$, let $\Delta \phi = 2\pi \Delta f \tau_0$ at time $t_0 + \Delta t_0$, $$\Delta \phi = [2\pi \Delta f + \delta(\Delta f)][\tau_0 + \delta \tau_0]$$

$$\cdot \frac{\delta \Delta f}{\Delta f}$$

being very small with respect to unity.

$$\cdot \delta \tau_0$$

is the variation in the delay $\tau_0$ of the target during the period $\Delta t_0$ between two observations. Therefore, $$\delta(\Delta \phi) = \Delta \phi' - \Delta \phi = 2\pi[\delta(\Delta f)\tau_0 + \Delta f \delta \tau_0 + \delta(\Delta f)\delta \tau_0]$$

The second term $2\pi \Delta f \delta \tau_0$ represents the part of the phase shift variation $(\delta(\Delta \phi))$ due to the existence of the radial velocity $V_r$.

The third term, of second order with respect to the first two is negligible in many practical cases.

We therefore obtain the following expression:

$$\delta(\Delta \phi) = 2\pi[\delta(\Delta f)\tau_0 + \Delta f \delta \tau_0]$$

When $2\pi \Delta f \delta \tau_0$ is small with respect to $2\pi \delta(\Delta f)\tau_0$, the measurement of $\delta(\Delta \phi)$ is an estimate of the measurement of $\tau_0$, and therefore of the target range.

When $2\pi \Delta f \delta \tau_0$ is not small with respect to $2\pi \delta(\Delta f)\tau_0$, it is necessary to measure this value separately.

Figure 10:
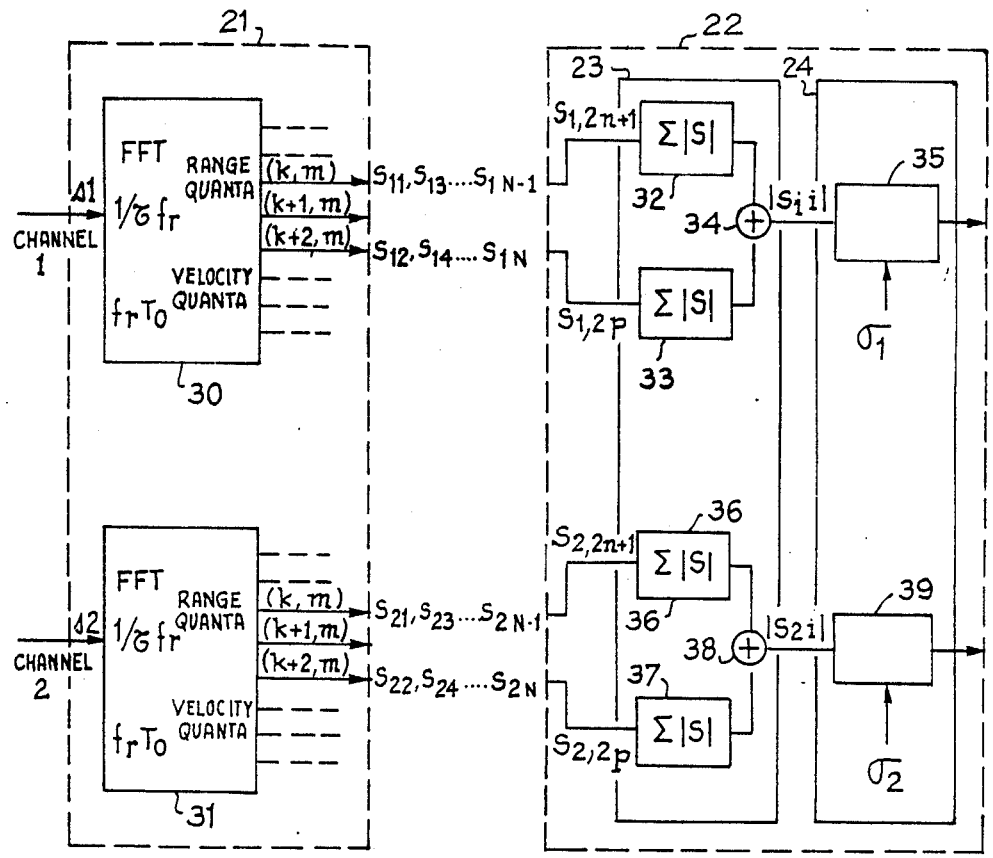
FIG. 10 represents a second particular embodiment of circuit 10 with a first embodiment of the extractor circuit 22.

FIG. 10 represents a second particular embodiment of the processing circuit 10 in the case of a medium repetition frequency (MRF) radar. MRF radars are airborne Doppler radars for the detection of airborne targets. These radars have the disadvantage of being ambiguous in range and velocity. They are intended for the detection of flying targets at any altitude and for calculating the velocity and the real range.

Each of the channels 1 and 2 is followed by a Fast Fourier Transform (FFT) digital operator 30 and 31 enabling the Doppler processing to be carried out. The coherent integration duration of these operators is $T_0$; the repetition period of the filtering cycles is $T_e$. The successive integration cycles of channel 1 are designated $C_{11}, C_{12}, C_{13} \ldots C_{1N}$ and the corresponding signals coming from the FFT operator are designated by $S_{11}, S_{12}, S_{13} \ldots S_{1N}$ for a given range-velocity resolution cell, N being the number of cycles during the illumination time of the target. These signals are available at the output of operator 30 at times $T_e, 2T_e, 3T_e \ldots NT_e$ respectively, taking the start of the first cycle as the time origin. In the same way the successive cycles of channel 2 are designated by $C_{21}$, $C_{22}$, $C_{23}$, ... $C_{2N}$; the corresponding signals are designated by $S_{21}$, $S_{22}$, $S_{23}$, ... $S_{2N}$, and are also available at times $T_e$, $2T_e$, $3T_e$ ... $NT_e$.

These operators 30 and 31 are consequently capable of delivering the signal corresponding to a given range and velocity quantum. The number of range quanta is equal to $1/\tau f_r$, $\tau$ being the duration of a pulse and $f_r$ the recurrence frequency and the number of velocity quanta is equal to $f_r T_0$.

The radar functions alternately from one cycle to the next at recurrence frequencies of $f_r$ and $f_r + \delta f_r$. We have therefore chosen two recurrence frequencies which are very slightly different from one cycle to another. Thus the cycles in odd positions defined by the general terms $C_{1,2n+1}$ and $C_{2,2n+1}$ where n is an integer, function at $f_r$ (n=0, 1, 2 ...)

$$\frac{N-2}{2},$$

if N is even), the cycles in even position $C_{1,2p}$ and $C_{2,2p}$ function at $f_r + f_r$ (p=1,2 ... N/2). $f_r$ and $f_r + \delta f_r$ are very close ($\delta f_r/f_r$ in the order of $10^{-3}$ for example). It is only in this case that from one cycle to another the signal from a target hardly changes range-velocity unit, and therefore there are very few pairs of range-velocity units to examine (whereas in traditional MRF radars variations in $f_r$ are much greater). The signals appear for example in the range quanta numbered k (even cycle) and k+2 (odd cycle) and in the velocity quantum number m. At the end of the illumination time T we therefore have, after putting into memory, pairs of elementary signals $S_{1i}$ and $S_{2i}$ (i=1, 2, 3 ... N) from which we can extract the amplitudes by calculating the modulus of $S_{1i}$ and the modulus of $S_{2i}$ (or their squares), the phases $\phi_{1i}$ and $\phi_{2i}$, the phase shifts $\Delta\phi_{2n+1}$ and $\Delta\phi_{2p}$ between $S_{1i}$ and $S_{2i}$, obtained respectively from the odd and even cycles.

On the first channel we therefore have signals coming from an odd cycle and designated by the general term $S_{1,2n+1}$ and also signals coming from an even cycle and designated by the general term $S_{1,2p}$.

Operators 32 and 33 which are part of circuit 22 respectively produce the sums of the moduli of these signals and transmit them to an adder 34 which delivers the sum of the moduli coming from the two cycles and which are referenced $S_{1i}$. A comparator 35 compares this signal with a first predetermined threshold level $\sigma_1$ and thus delivers a first criterion of level N1.

There is an alarm if $$\frac{1}{N} \sum_{i=1}^{N} |S_{1i}| > \sigma_1$$

In the same way on the second channel there appear the signals corresponding to the odd cycles and designated by the general term $S_{2,2n+1}$ and the signals corresponding to the even cycles and designated by the general term $S_{2,2p}$. Operators 36 and 37 receive these signals and calculate the moduli and respectively produce the sums of the moduli of each of them and transmit these signals to an adder 38 which delivers the sum of the moduli coming from the two positions which are referenced $S_{2i}$. A comparator 39 receives this signal and compares it with a second predetermined threshold level $\sigma_2$ and delivers a second criterion of level N2. The detection decision depends on the level criteria obtained for these two channels.

There is an alarm if $$\frac{1}{N} \sum_{i=1}^{N} |S_{2i}| > \sigma_2$$

Circuits 32 to 39 form the extractor 22.

In order to facilitate comprehension, let us take the following numerical example, with a receiver architecture such as represented in FIG. 3.

$f_e = 10,000$ MHz, $\tau = 0.5$ μs, $f_r = 20$ kHz $\delta f_r = 20$ Hz, $\Delta f = 1$ MHz (let K=25) and $\delta(\Delta f) = 2K\delta f_r = 1,000$ Hz.

Each of the channels 1 and 2 is followed by a discrete digital Fourier transform operator (FFT).

The illumination time of a target by a radar, in search phase, is $T_i = 50 \cdot 10^{-3}$ s The duration of coherent integration is $T_0 = 2 \cdot 10^3$ s.

The repetition period of filtering cycles is $T_e = 3$ ms.

The number of cycles N during the illumination time is therefore about 16 on each of the two channels: $N T_e = T_i$ These values correspond to the traditionally usable orders of magnitude for MRF radars.

The successive cycles of channel 1 are designated by $C_{11}$, $C_{12}$, $C_{13}$ ... $C_{1N}$ and the corresponding signals coming from the FFT operator by $S_{11}$, $S_{12}$, $S_{13}$ ... $S_{1N}$ (for a given range-velocity resolution cell).

These signals are available at times: $T_e$, $2T_e$, $3T_e$ ... $NT_e$ and taking the start of the first cycle as time origin.

Also the successive cycles of channel 2 are designated by $C_{21}$, $C_{22}$, $C_{23}$ ... $C_{2N}$, the corresponding signals by $S_{21}$, $S_{22}$, $S_{23}$ ... $S_{2N}$, and are also available at times $T_e$, $2T_e$, $3T_e$ ... $NT_e$.

The radar functions alternately, from one cycle to the next, at recurrence frequencies of $f_r$ and $f_r + \delta f_r$.

Cycles in odd positions $C_{1,2n+1}$ and $C_{2,2n+1}$ function at $f_r$ (n=0, 1, 2 ... 7), and the cycles in even positions $C_{1,2p}$ and $C_{2,2p}$ function at $f_r + \delta f_r$ (p=1, 2 ... 8)

At the end of time $T_i$ we therefore have, after putting into memory, 2N elementary signals $S_{1i}$ and $S_{2i}$ (i=1, 2, 3 ... N) from which we extract:

the amplitudes $|S_{1i}|$ and $|S_{2i}|$ (or their squares)

the phases $\phi_{1i}$ and $\phi_{2i}$ the phase shifts $\Delta\phi_{2n+1}$ and $\Delta\phi_{2p}$ between $S_{1i}$ and $S_{2i}$, the use of which will differ depending on whether they come from the comparison of signals coming from odd or even cycles.

In the chosen case, there are therefore eight even cycles and eight odd cycles for each channel.

Figure 11:
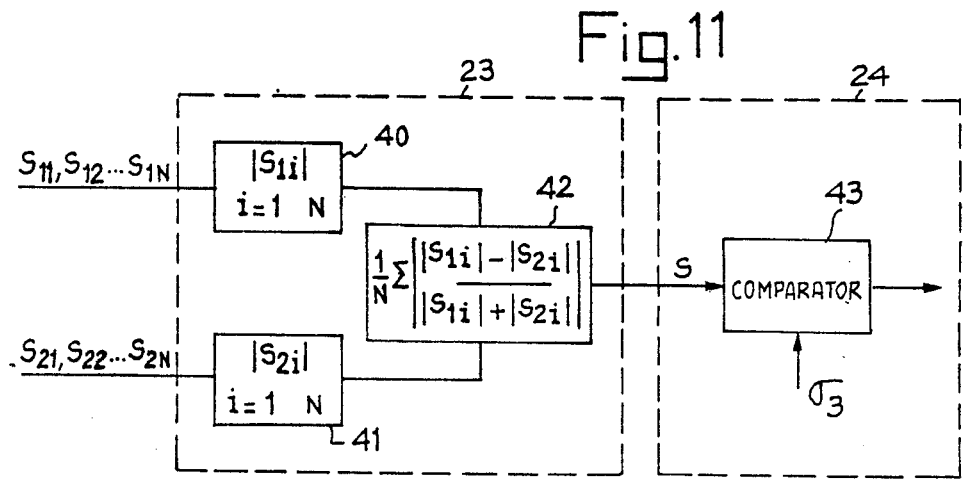
FIGS. 11, 12 and 13 represent different embodiments of the extractor circuit 22 relating to the embodiment represented in FIG. 10.

FIG. 11 represents a second embodiment of an extractor wherein an attempt is made to define the point in space of a target (as compared with the width of the range quantum). In order to do this circuit 23 produces, by standardized comparison of the amplitudes of the signals appearing simultaneously on the two channels without distinction between even and odd channels and after averaging over the number N of available samples, a signal S which is compared with a predetermined threshold $\sigma_3$ in order to obtain a point in space criterion. We will say that there is an alarm if:

$$\frac{1}{N} \sum_{i=1}^{N} \left| \frac{|S_{1i}| - |S_{2i}|}{|S_{1i}| + |S_{2i}|} \right| < \sigma_3$$

Circuit 23 therefore includes in this embodiment a circuit 40 and a circuit 41 enabling the moduli of the input signals $S_{1i}$ and $S_{2i}$ respectively to be obtained, i varying from 0 to N. A circuit 42 carries out the operation of the standardized mean of these signals in order to obtain the signal S. A comparator 43 compares this signal S with the predetermined threshold 3.

There is alarm if:

$$\frac{1}{N} \sum_{i=1}^{N} \left| \frac{|S_{1i}| - |S_{2i}|}{|S_{1i}| + |S_{2i}|} \right| < \sigma_3$$

Figure 12:
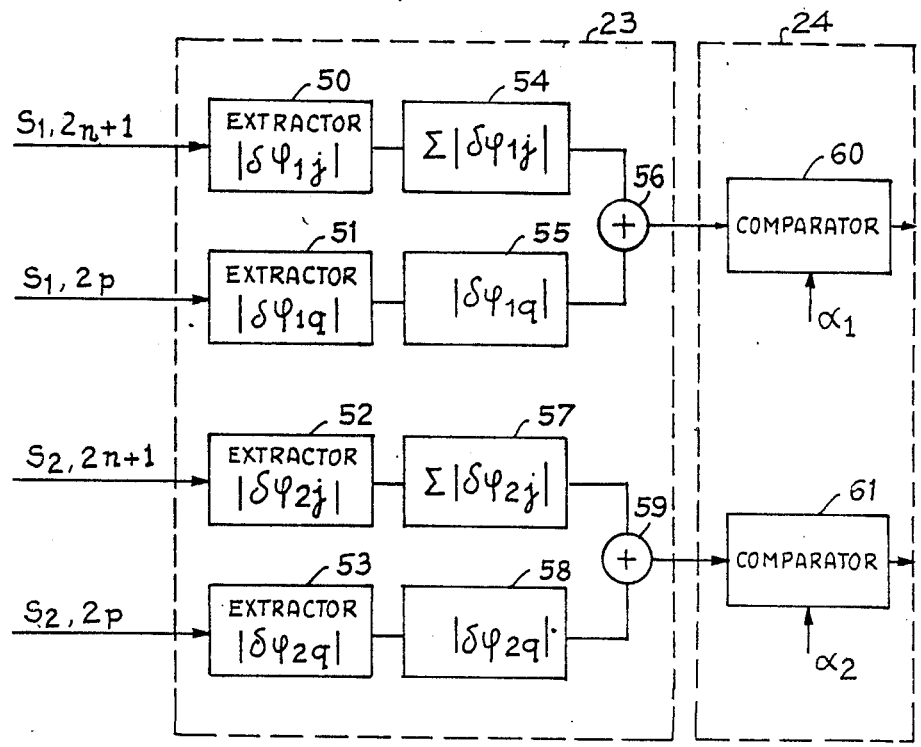

FIG. 12 represents a third embodiment of the extractor 22. This diagram shows extraction criteria other than those described with reference to FIG. 10.

On each channel 1 and 2 represented in FIG. 12, the odd and even cycles are considered separately. Two operators 50 and 51 respectively receive from channel 1 the signals coming from an odd cycle designated by the general term $S_{1,2n+1}$ and the signals coming from an even cycle designated by the general term $S_{1,2p}$. In the same way the operators 52 and 53 respectively receive from channel 2 the signals coming from an odd cycle $S_{2,2n+1}$ and signals coming from an even cycle $S_{2,2p}$. These operators enable for each group considered separately the second phase difference to be obtained, $\delta\phi$ which is equal to $\phi_j - 2\phi_{j-1} + \phi_{j-2}$. Therefore for each group $(N-2/2)$, there are values $\delta_j$ of which we take the absolute values and of which we take the mean by means of operators 54 to 59 respectively. The odd group of channel 1 gives:

$$|\delta_{1j}| = \frac{1}{\frac{N}{2} - 2} \sum_{j}^{N-1} |\delta\phi_{1j}|$$

$j = 2n + 1$ $n = 2, 3, \frac{N-2}{2}$

The even group of channel 1 gives:

$$|\delta\phi_{1q}| = \frac{1}{\frac{N}{2} - 2} \sum_{q}^{N} |\delta\phi_{1q}|$$

$q = 2p$ $p = 3, 4, \frac{N}{2}$

Similarly, the corresponding values of channel 2 are:

$$|\delta_{2j}| = \frac{1}{\frac{N}{2} - 2} \sum_{j}^{N-1} |\delta\phi_{2j}|$$

$$|\delta_{2q}| = \frac{1}{\frac{N}{2} - 2} \sum_{q}^{N} |\delta\phi_{2q}|$$

Finally, the group mean is produced for each channel:

$$|\delta\phi1| = \tfrac{1}{2}[|\delta\phi_{1j}| + |\delta\phi_{1q}|]$$
$$|\delta\phi2| = \tfrac{1}{2}[|\delta\phi_{2j}| + |\delta\phi_{2q}|]$$
$$\overline{|\delta\phi1|} \text{ and } \overline{|\delta\phi2|}$$

measure the mean dispersion and the phase difference between successive signals of the same channel. We thus establish a detection criterion from this measurement declaring that there is an alarm on channel 1 if $\overline{\delta\phi 1}$ is less than $\alpha 1$; on channel 2 if $\overline{|\delta\phi 2|}$ is less than $\alpha 2$; $\alpha 1$ and $\alpha 2$ are predetermined thresholds depending on the application.

Two comparators 60 and 61 make the comparisons between the output signals of summers 56 and 59 respectively with the thresholds $\alpha 1$ and $\alpha 2$.

Figure 13:
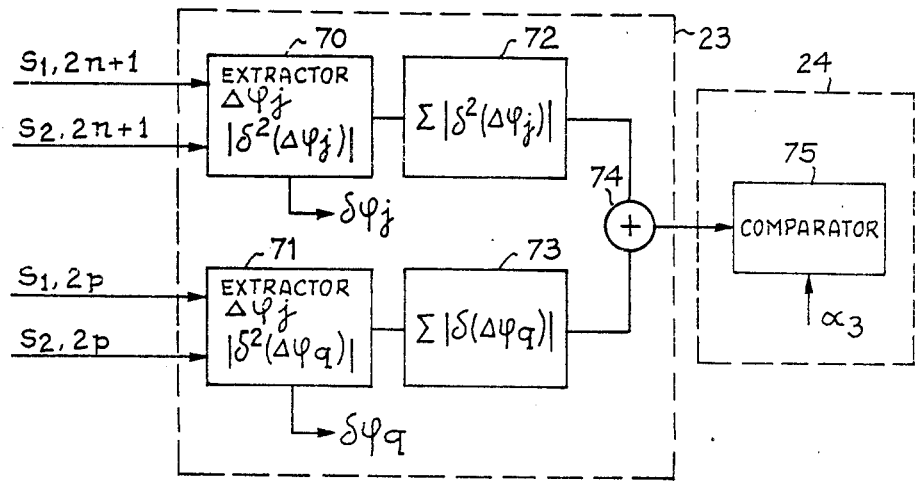

FIG. 13 represents a fourth embodiment of the extractor 22 for a medium recurrence frequency radar.

In this figure the circuit 23 includes an operator 70 receiving the signals $S_{1,2n+1}$ and $S_{2,2n+1}$ coming from the odd cycles from both channels 1 and 2 and an operator 71 receiving the signals $S_{1,2p}$ and $S_{2,2p}$ coming from the even cycles from both channels 1 and 2.

The operator 70 extracts the phase difference $\Delta\phi j$ and carries out the second difference of the shift of this phase or phase differential $\Delta\phi j$ between two signals coming from an odd cycle, one of which comes from channel 1 and the other from channel 2.

Operator 71 extracts the phase shift $\Delta\phi q$ and carries out the second difference of the phase shift or phase differential $\Delta\phi q$ between two signals coming from an even cycle, one of which comes from channel 1 and the other from channel 2.

Two operators 72 and 73 enable the calculation of the mean value over N values for each of the signals coming from operators 70 and 71 respectively. A summer 74 produces the sum of the signals coming from operators 72 and 73. This sum signal is compared with a predetermined threshold $\alpha_3$ by means of a comparator 75.

Circuits 70 to 73 produce the means of the absolute values of the second differences (symbolized by $\delta^2$):

$$|\delta^2(\Delta\phi)_j| = \frac{1}{\frac{N}{2} - 2} \sum_{j}^{N-1} |\delta^2(\Delta\phi)_j|$$

$$|\delta^2(\Delta\phi)_q| = \frac{1}{\frac{N}{2} - 2} \sum_{q}^{N-1} |\delta^2(\Delta\phi)_q|$$

Where $\delta^2(\Delta\phi)_j = \Delta\phi_j - 2\Delta\phi_{j-1} + \Delta\phi_{j-2}$ and $\delta_2(\Delta\phi)_q = \Delta\phi_q - 2\Delta\phi_{q-1} + \Delta\phi_{q-2}$ Operator 74 then enables the calculation of the mean value of the two groups of signals:

$$\overline{|\delta^2\Delta\phi|} = \tfrac{1}{2}[\overline{|\delta^2(\Delta\phi)_j|} + \overline{|\delta^2(\Delta\phi)_q|}]$$

This value measures the mean dispersion of the differential phase variation as a function of time. It is declared that there is an alarm if $\overline{|\delta^2(\Delta\phi)|} < \alpha_3$. This circuit 22 enables the setting up of a point of origin criterion in differential frequency (difference in Doppler frequency).

Figure 14:
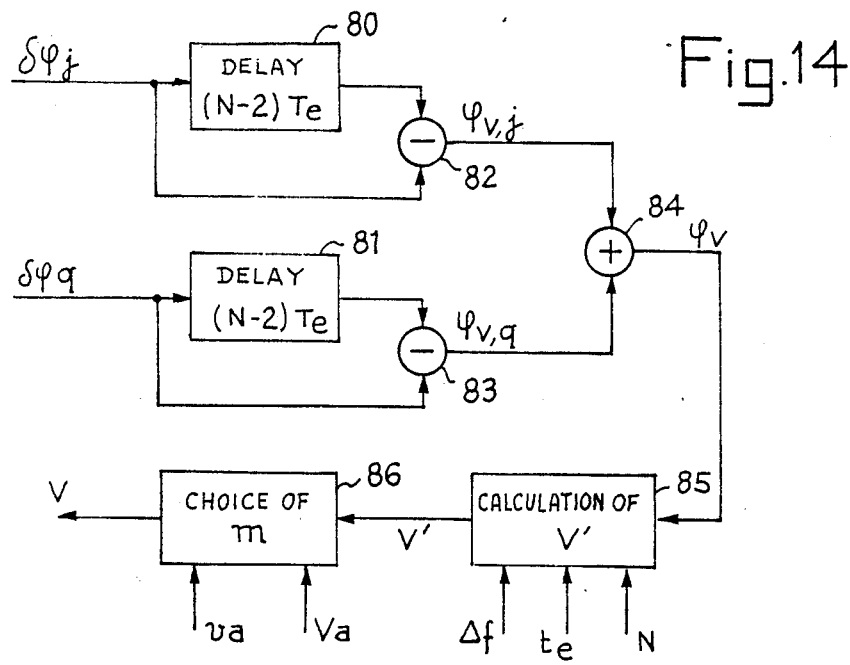
FIG. 14 represents a first embodiment of a measuring circuit according to FIG. 10 enabling the removal of velocity ambiguity.

FIG. 14 is an embodiment of the measuring circuit 25 measuring the non-ambiguous velocity and therefore removing velocity ambiguity. In this case the signals of the even and odd groups are considered separately.

The odd cycles enable the measurement of the differential phase variation between times $(N-1)T_e$ and $$T_e: \delta\phi_1 = 2\pi\Delta f \frac{d\tau_0}{dt} (N-2) T_e, \frac{d\tau_0}{dt}$$

being assumed constant during the period of observation.

The even cycles enable the measurement of the phase differential variation between times $NT_e$ and $2T_e$:

$$\delta\phi_2 = 2\pi[\Delta f + \delta(\Delta f)] \frac{d\tau_0}{dt} (N-2)T_e$$

$\delta(\Delta f)/\Delta f$ being very small is ignored. The two values $\delta\phi_1$ and $\delta\phi_2$ are therefore approximately identical; we produce the mean $\phi_V$ of these two values, $\phi_V$ is therefore equal to $$2\pi\Delta f \frac{d\tau_0}{dt} (N-2)T_e.$$

Knowledge of $\phi_V$ enables the extraction by calculation of $d\tau_0/dt$ and therefore of the estimated radial velocity $$V\left(\phi_V = \frac{4\pi\Delta f}{c} \cdot V\right).$$

If $V_a$ is the space between two velocity ambiguities of the radar ($V_a = cf_r/2f_e$) and $v_a$ is the ambiguous velocity given by the identification of the Doppler filter; m being a positive integer, negative integer or zero; the real velocity V can be calculated. The estimated velocity V' enables m to be determined, V is deduced from the equation:

$$V = mv_A + v_a$$

The estimated value V' of the real velocity is compared with the various possible discrete values of V. A value of m will be chosen which will give the value of V closest to V'.

For this, we use for example the phase differences $\Delta\phi_j(j=2n+1)$ and $\Delta\phi_q(q=2p)$, $\Delta\phi_j$ being the phase difference between the signals $S_{1,2n+1}$ and $S_{2,2n+1}$; $\Delta\phi j$ being the phase difference between the signals $S_{1,2p}$ and $S_{2,2p}$. These differences are obtained for example by means of circuits 70 and 71 before producing the second difference. A delay circuit 80 delays the signals $\Delta\phi j$ by a value equal to $(N-2)T_e$.

In the same way a delay circuit 81 delays the $\Delta\phi j$ signals by a value equal to $(N-2)T_e$. A subtractor 82 produces the difference between the delayed signal $\Delta\phi j$ and the non-delayed signal $\Delta\phi j$ in order to obtain the phase $\phi_{V,j}$. A subtractor 83 produces the difference between the delayed signal $\Delta\phi q$ and the non-delayed signal $\Delta\phi q$. An adder 84 produces the signal $\phi V$ corresponding to the sum of the signals $\phi_{V,j}$ and $\phi_{V,q}$. An operator 85 extracts the value of V' from signals $\phi_V$, $\Delta f$, $T_e$ and N. An operator 86 enables the determination of the velocity unit m from V', $v_a$ and $V_a$ in order to obtain V.

Figure 15:
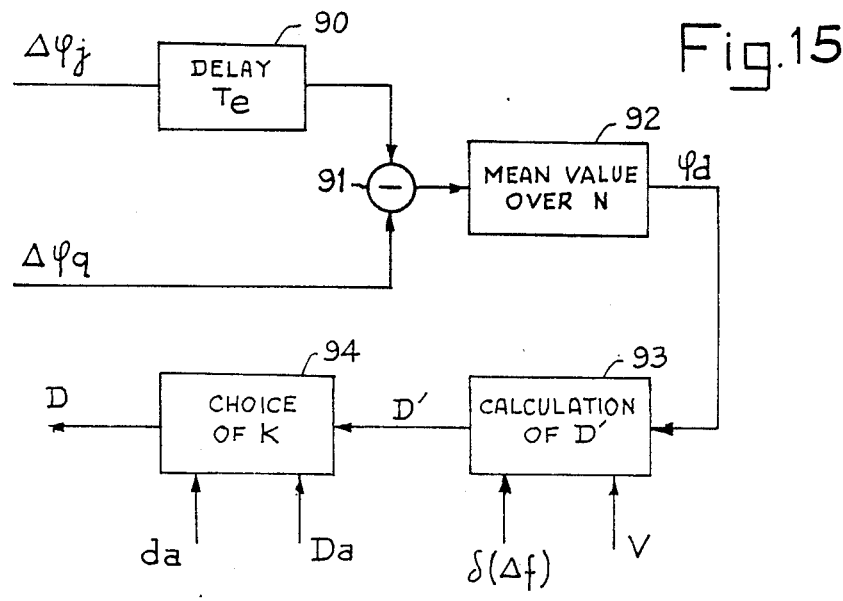
FIG. 15 represents a second embodiment of a measuring circuit according to FIG. 10 enabling the removal of range ambiguity.

FIG. 15 represents an example of the measuring circuit 25 measuring the range and therefore removing range ambiguity.

The phase difference between channels, measured at the end of an odd cycle is $\Delta\phi_j = 2\pi\Delta f \tau_0(t)$.

The phase difference measured at the end of the next even cycle is:

$$\Delta\phi_q = 2\pi[(\Delta f + \delta(f)][\tau_0(t+T_e) + \delta\tau_0]$$

In this case we take account of the term $2\pi\Delta f \delta\tau_0$ which represents the part in $\Delta\phi q$ which is due to the variation in $\tau_0$ during the time $T_e$ $$\delta\tau_0 = T_e \cdot \frac{d\tau_0(t)}{dt};$$

$$\Delta\phi_q - \Delta\phi_j = 2\pi[\delta(\Delta f)\tau_0(t) + \Delta f \delta\tau_0]$$

designating by $\delta\tau_0$ the variation in the delay during $T_e$ and ignoring the term $2\pi\Delta f \delta\tau_0$.

It is in fact necessary to take account of the terms $2\pi\delta(\Delta f)\delta\tau_0$ so that $\tau_0(t)$ can be calculated from $(\Delta\phi_q - \Delta\phi_j)$ and $\delta(\Delta f)$.

$$2\pi\Delta f \delta\tau_0 = 2\pi\Delta f \cdot \frac{d\tau_0(t)}{dt} \cdot T_e$$

can therefore be known from the measurement of V (and more particularly of $\phi_V$).

The mean $\phi_d$ is produced such that:

$$\phi_d = \frac{2}{N} \sum_{p=1}^{N/2} (\Delta\phi_{2p} - \Delta\phi_{2p-1})$$

D designates the real range of the target and $D_a$ designates the ambiguity in range of the radar ($D_a = c/2f_r$), $D = kD_a + d_a$; k is a positive integer or zero, and $d_a$ is the ambiguous range of the radar.

The estimated value of the real range D' resulting from the calculation of the measurement of $\phi_d$ is compared with the possible discrete values obtained for various values of k. The value of k will be chosen which gives the value of D which is closest to D'.

For this we use for example, the phase differences $\Delta\phi_j(j=2n+1)$ and $\Delta\phi_q(q=2p)$ obtained from the extractor circuits 70 and 71 at the differentiation operation.

The signal $\Delta\phi j$ is delayed by a value $T_e$ by a delay circuit 90. This delayed signal is deducted from the signal $\Delta\phi q$ by a subtractor 91 to produce the signal $\Delta\phi_q - \Delta\phi_j$. An operator 92 calculates the mean value $\phi_d$ of the N values, $$\phi_d = \frac{2}{N} \sum_{1}^{N/2} (\Delta\phi_q - \Delta\phi_j)$$

An operator 92 receiving the signals $\phi_d$, V and $\delta(\Delta f)$ calculates D'. An operator 94 receiving the signals D', $d_a$ and $D_a$ determines the range unit k and produces the real range D.

What is claimed is:

1. Radar apparatus for processing a received signal having a carrier frequency $f_0$, comprising:
   means for directing said received signal in parallel into first and second channels;
   first filter means in said first channel, for bandpass filtering said received signal, said first filter means being centered at $f_1 = f_0 + \Delta_1 f$, said first filter means providing a first output signal having a first central frequency $f_0 + \Delta_1 f/2$;

second filter means in said second channel, for bandpass filtering said received signal, said second filter means being centered at $f_2 = f_0 + \Delta_2 f$, said second filter means providing a second output signal having a second central frequency $f_0 + \Delta_2 f/2$;

first mixer means, coupled in said first channel to receive said first output signal, for mixing said first output signal with a signal $f_1 = f_0 + \Delta_1 f/2$ to provide a first mixed signal $S_1$;

second mixer means, coupled in said second channel to receive said second output signal, for mixing said second output signal with a signal $f_2 = f_0 + \Delta_2 f/2$ to provide a second mixed signal $S_2$; and processing means for receiving said signals $S_1$ and $S_2$ and providing a processed output signal containing information about said received signal.

2. Apparatus according to claim 1, wherein said processing means includes a Doppler processing circuit operating on the signals $S_1$, $S_2$ output from each channel, an extractor enabling a detection decision criteria to be applied, and a range and/or velocity ambiguity removing circuit.

3. Apparatus according to claim 2, wherein the ambiguity removing circuit includes means for carrying out measurements of a velocity and/or range of detected targets.

4. Apparatus according to claim 2, wherein the Doppler processing circuit includes a discrete Fourier transform circuit operating on said signals $S_1$, $S_2$ of the two channels, and wherein the extractor circuit includes a first operator enabling a phase shift $\Delta\phi$ between the two channels to be obtained and a second operator enabling a variation in said phase shift between two given times to be obtained.

5. Apparatus according to claim 2, wherein said received signal corresponds to a transmission signal having trains of pulses having a recurrence frequency alternately equal to $f_r$ or to $f_r + \delta f_r$, and wherein said Doppler processing circuit includes a first fast Fourier Transform operator receiving the mixed signal $S_1$, a second Fast Fourier Transform operator receiving the mixed signal $S_2$; said Transform operators being capable of delivering for a given range-velocity quantum, signals $(S_{1,2n+1}, S_{2,2n+1})$ coming from an odd filtering cycle corresponding to one of the two recurrence frequencies, and for another given range-velocity quantum, signals $(S_{1,2p}, S_{2,2p})$ coming from an even filtering cycle corresponding to the other recurrence frequency.

6. Apparatus according to claim 2, wherein said extractor circuit includes:
   first and second operators capable of respectively producing a sum of the moduli of one of said signals $S_1$, $S_2$ and coming from odd and even filtering cycles;
   a first adder producing a sum of the moduli coming from the two cycles;
   third and fourth operators capable of respectively producing a sum of the moduli of the other one of said signals $S_1$, $S_2$ and coming from odd and even filtering cycles;
   a second adder producing a sum of the moduli coming from the two cycles; and
   a compressor coupled at an output of each summer enabling, each from two predetermined thresholds ($\sigma_1$, $\sigma_2$), the provision of a detection decision criterion for each of the channels.

7. Apparatus according to claim 2, wherein said extractor circuit includes a first operator capable of obtaining a modulus of one of the signals $S_1$, $S_2$ from one of the two channels irrespective of filtering cycles; a second operator capable of obtaining modulus of signals from the other signal $S_1$, $S_2$ from the other channel irrespective of filtering cycles; a third operator capable of producing a standardized two channels taken over a number N of signals coming from the first and second operators; and a comparator enabling, from a predetermined detection threshold ($\sigma_3$), a detection decision criterion for the two channels to be applied.

8. Apparatus according to claim 2, wherein said extractor circuit includes first and second operators receiving the mixed signal coming from one of the two channels at odd and even filtering cycles and capable of extracting a first phase variation between two given times; third and fourth operators capable of producing a mean of an absolute value of said first phase variation for each cycle; a first adder providing a sum of the means of each cycle; fifth and sixth operators respectively receiving the mixed signal coming from the other channel at odd and even filtering cycles and capable of extracting a second phase variation between two given times; seventh and eighth operators capable of producing a mean of an absolute value of the second phase variation for each cycle; a second adder producing the sum of the means of each cycle; and a comparator connected to the output of each adder providing, from a detection threshold ($\alpha_1$, $\alpha_2$), a detection criterion for each channel.

9. Apparatus according to claim 2, wherein said extractor circuit includes a first operator receiving the signals $S_1$, $S_2$ from the two channels at even filtering cycles and producing, a first difference in phase shift between the two channels; a second operator producing a mean over all output signals of the first operator; a third operator receiving signals $S_1$, $S_2$ from the two channels at odd filtering cycles and producing a second difference in phase shift between the two channels; a fourth operator producing a mean over all output signals of the third operator; a summer producing a sum of the means; and a comparator connected to an output of the summer for providing, from a detection threshold ($\alpha_3$), a detection criterion for the two channels.

10. Apparatus according to claim 2, wherein the ambiguity removing circuit includes a velocity measuring circuit including a first delay circuit followed by a first subtractor; a second delay circuit followed by a second subtractor; the first and second subtractors being coupled to an adder, which is followed by an operator enabling the extraction of an estimated value of the velocity, said operator being followed by a velocity unit enabling the determination of a real velocity.

11. Apparatus according to claim 2, wherein the ambiguity removing circuit includes a range measuring circuit including a delay circuit, followed by a subtractor, followed by an operator enabling the production of a mean over a number N of values obtained at an output of the subtractor; said operator being followed by a calculating circuit enabling an estimated value of the range to be obtained, the calculating circuit being followed by a range device enabling the determination of a real range.

12. Apparatus according to claim 1 wherein said received signal is an intermediate frequency signal, and wherein said first and second filter means each include means for filtering with the same passband.

13. Apparatus according to claim 1 wherein said first and second central frequencies are respectively carrier frequencies for said first and second channels, and wherein said first and second mixers include means for removing said carrier frequencies from said first and second output signals.

14. Apparatus according to claim 1 wherein said first and second filter means include means for spacing said first and second central frequencies at a distance $\frac{1}{2}\tau$ from said frequency $f_0$, wherein $\tau$ is a duration of a transmitted pulse.

15. Apparatus according to claim 1 wherein said first and second filter means each include means for filtering the same passband, said passband including said received signal carrier frequency $f_0$.

16. Radar apparatus for processing a received signal having a carrier frequency $f_0$, comprising:

means for directing said received signal in parallel into first and second channels;

first mixer means, coupled in said first channel, for carrying out a frequency transposition of value $\Delta_1 f$ of said received signal;

second mixer means, coupled in said second channel, for carrying out a frequency transposition of value $\Delta_2 f$ of said received signal;

first filter means coupled in said first channel and receiving an output of said first mixer means, for providing a first output signal having a first central frequency $f_0 + \Delta_1 f/2$, said first filter means being matched at frequency $f_0$;

second filter means, coupled in said second channel and receiving an output from said second mixer means, for producing a second output signal having a second central frequency $f_0 + \Delta_2 f/2$, said second filter means being matched at said frequency $f_0$;

third mixer means, coupled in said first channel and receiving an output from said first filter means, for mixing said first output signal with a signal of frequency $f_1 = f_0 + \Delta_1 f/2$ to provide a first mixed signal $S_1$;

fourth mixer means, coupled in said second channel and receiving an output from said second filter means, for mixing said second output signal with a signal of frequency $f_2 = f_0 + \Delta_2 f/2$ to provide a second mixed signal $S_2$; and processing means for receiving said signals $S_1$ and $S_2$ and providing a processed output signal containing information about said received signal.

17. Apparatus according to claim 16 wherein said first mixer means includes means for frequency transposing said received signal by $\Delta_1 f$, where $\Delta_1 f$ is equal to $-\Delta_1 f$, and wherein said second mixer means includes means for frequency transposing said received signal by $\Delta_2 f$, where $\Delta_2 f$ is equal to $+\Delta_1 f$.

18. Apparatus according to claim 16 wherein said first and second mixer means include means to remove carrier frequencies $f_1$ and $f_2$ from said received signal.

19. Apparatus according to claim 16 wherein each of said first and second filter means include means for passband filtering said received signal, said passband being approximately $1/\tau$, wherein $\tau$ is a duration of a transmitted pulse.

20. Apparatus according to claim 16 wherein said first and second mixer means include means for separating said frequency $f_1$ from said frequency $f_2$ by an amount equal to approximately $\frac{1}{2}\tau$, wherein $\tau$ is a duration of a transmitted pulse.

* * * * *